(12) United States Patent
Herndon et al.

(10) Patent No.: US 12,362,450 B2
(45) Date of Patent: Jul. 15, 2025

(54) ADDITIVELY MANUFACTURED CLUSTER CONNECTOR

(71) Applicant: Raytheon Company, Waltham, MA (US)

(72) Inventors: Mary K. Herndon, Littleton, MA (US); Nahid Rahman, Tewksbury, MA (US); Russell Anderson, Merrimack, NH (US); John David Lovaasen, Tyngsborough, MA (US); David Joseph Palumbo, Cambridge, MA (US); Michael Wayne Cason, Merrimack, NH (US)

(73) Assignee: Raytheon Company, Arlington, VA (US)

( * ) Notice: Subject to any disclaimer, the term of this patent is extended or adjusted under 35 U.S.C. 154(b) by 365 days.

(21) Appl. No.: 17/818,929

(22) Filed: Aug. 10, 2022

(65) Prior Publication Data

US 2024/0055814 A1 Feb. 15, 2024

(51) Int. Cl.
*H01P 3/06* (2006.01)
*H01Q 5/25* (2015.01)
*B33Y 80/00* (2015.01)
*H01R 103/00* (2006.01)

(52) U.S. Cl.
CPC ............... *H01P 3/06* (2013.01); *H01Q 5/25* (2015.01); *B33Y 80/00* (2014.12); *H01R 2103/00* (2013.01)

(58) Field of Classification Search
CPC ........... H01P 3/06; H01P 11/005; H01Q 5/25; H01Q 17/008; B33Y 80/00; B33Y 10/00; H01R 2103/00; B22F 7/08; B22F 10/28
See application file for complete search history.

(56) References Cited

U.S. PATENT DOCUMENTS

| | | | |
|---|---|---|---|
| 6,201,509 B1 | 3/2001 | Zhang et al. | |
| 6,210,223 B1 * | 4/2001 | Aoyama | H01R 43/04 439/585 |
| 7,283,101 B2 | 10/2007 | Bisiules et al. | |
| 7,384,306 B2 * | 6/2008 | Malstrom | H01R 13/6592 439/879 |
| 7,409,127 B1 * | 8/2008 | Hurley | G02B 6/3817 385/101 |
| 9,325,121 B2 * | 4/2016 | Gundel | H01B 7/0861 |
| 9,991,605 B2 | 6/2018 | Elsallal et al. | |

(Continued)

OTHER PUBLICATIONS

Mast Technologies, "Lossy Foam Absorber;" MF22-0009-00 Data Sheet; Revised Nov. 20, 2011; 1 Page.

(Continued)

*Primary Examiner* — Seung H Lee (74) *Attorney, Agent, or Firm* — Schwegman Lundberg & Woessner, P.A.

(57) ABSTRACT

Described herein is an apparatus and a method for a cluster connector. The cluster connector comprises at least three coaxial-cable core conductors formed in an additive manufacturing process; a dielectric around each of the three coaxial-cable core conductors, formed in the additive manufacturing process; a metallic shield around each dielectric, formed in the additive manufacturing process; at least one stub on each metallic shield, formed in the additive manufacturing process; and a common ground connection connected to each metallic shield, formed in the additive manufacturing process.

20 Claims, 7 Drawing Sheets

(56) References Cited

U.S. PATENT DOCUMENTS

| | | | |
|---|---|---|---|
| 10,133,019 B2* | 11/2018 | Kowalczyk | G02B 6/44715 |
| 10,720,709 B2 | 7/2020 | Kildal et al. | |
| 10,854,993 B2 | 12/2020 | Franzini et al. | |
| 10,886,625 B2 | 1/2021 | Franzini et al. | |
| 10,923,830 B2 | 2/2021 | Lin et al. | |
| 2020/0028242 A1 | 1/2020 | Brigham et al. | |
| 2021/0351541 A1 | 11/2021 | Urtz et al. | |
| 2022/0029316 A1* | 1/2022 | Wu | H01R 13/518 |
| 2022/0200159 A1 | 6/2022 | Abdelrahman et al. | |

OTHER PUBLICATIONS

Akbari et al., "Highly Efficient 30 GHz 2×2 Beamformer Based on Rectangular Air-Filled Coaxial Line;" Proceedings of the IEEE Transactions on Antennas and Propagation, vol. 68, No. 7; Jul. 2020; 11 Pages.

Ke et al., "Design and Realisation of Low Loss Air-Filled Rectangular Coaxial Cable with Bent Quarter-Wavelength Supporting Stubs;" Journal Article from Microwave and Optical Technology Letters, vol. 50, No. 5; May 2008; 4 Pages.

Kim et al., "Single-Layer and Bilayer Four-Arm Mode 1 Spiral Antennas and Their Feed Structures;" International Journal of RF and Microwave Computer-Aided Engineering, vol. 22, No. 6; Mar. 27, 2012; 11 Pages.

Palazzi et al., "Compact 3-D-Printed 4×4 Butler Matrix Based on Low-Cost and Curing-Free Additive Manufacturing;" IEEE Microwave and Wireless Components Letters, vol. 31, No. 2; Feb. 2021; 4 Pages.

Stutzke et al., "Four-Arm $2^{nd}$-Mode Slot Spiral Antenna with Simple Single-Port Feed;" IEEE Antennas and Wireless Propagation Letters, vol. 4; Jan. 1, 2005; 4 Pages.

PCT International Search Report and Written Opinion dated Oct. 9, 2023 for International Application No. PCT/US2023/069043; 17 Pages (Atty. Dckt. No. RMD-013PWO).

"International Application Serial No. PCT US2023 069043, International Preliminary Report on Patentability mailed Feb. 20, 2025", 11 pgs.

"Australian Application Serial No. 2023321825, First Examination Report mailed May 7, 2025", 4 pgs.

* cited by examiner

ADDITIVELY MANUFACTURED CLUSTER CONNECTOR

BACKGROUND

Ultra-wideband (UWB) radio frequency (RF) antennas are limited by the bandwidth of feed networks. UWB antennas with direction-sensing capability have not yet been fully additively manufactured.

SUMMARY

In accordance with the concepts described herein, an exemplary additively manufactured cluster connector and fabrication method therefor provide a one-step printed manufacture of a monolithic phase-matched RF cluster connector suitable for use in an UWB electronic system.

In accordance with the concepts described herein, an exemplary additively manufactured cluster connector and fabrication method therefor eliminate multiple manufacturing steps required to assemble an RF cluster connector by a conventional method.

In accordance with the concepts described herein, an exemplary additively manufactured cluster connector and fabrication method therefor provide an additively manufactured (e.g., a 3D-printed) cluster connector that is not manufacturable by a conventional method.

In accordance with the concepts described herein, an exemplary additively manufactured cluster connector and fabrication method therefor provide a cluster connector that is inexpensive, lightweight, and capable of being rapidly prototyped, which has a size and an electronic performance comparable to, or better than, a conventionally fabricated counterpart.

In accordance with the concepts described herein, an exemplary additively manufactured cluster connector and fabrication method therefor provide a cluster connector that may be monolithically integrated to other modules in an electronic assembly and fabricated as one unit with those modules.

In accordance with the concepts described herein, exemplary additively manufactured cluster connector and method provide a cluster connector that reduces the number of separate parts that are required to be manufactured in one system.

DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

The present disclosure provides a fully additively manufactured (e.g., 3D-printed) phase-matched cluster connector. The present disclosure provides, in an exemplary embodiment, a flared, or tapered, stub that may be used to obtain an UWB RF response. The exemplary cluster connector of the present disclosure can be used as feed networks for antennas with very large bandwidths.

In an exemplary embodiment, cylindrical connectors are arranged in a ring configuration and attached to a common ground in a center of the ring. Three or more connectors may be arranged in this manner for multi-mode operation of direction-sensing antennas.

In an exemplary embodiment, stubs (e.g., radially flared stubs) which are not machinable by conventional manufacturing methods are designed for operation across wide bandwidths.

The present disclosure discloses a coaxial cluster (e.g., ≥3 coaxial connectors or coaxes) that may be used as a feed to a monolithically integrated antenna that is also capable of sensing angular direction of arrival. At least 3 coaxial connectors (or coaxes) are required to sense two polar co-ordinates that completely define a direction in a hemispherical space. A 2-coax spiral antenna cannot be used to sense two polar co-ordinates, at least 3 coaxes are required. The present disclosure discloses a cluster connector capable of detecting angular position in a monolithically fabricated system. There is interest in UWB systems for utilization of available spectrum in microwave and millimeter wave frequencies. The present disclosure discloses a cluster connector that provides phase-matched (e.g., phase-aberration-free due to symmetry of arrangement) feeding for direction finding (DF) systems.

Figure 1:
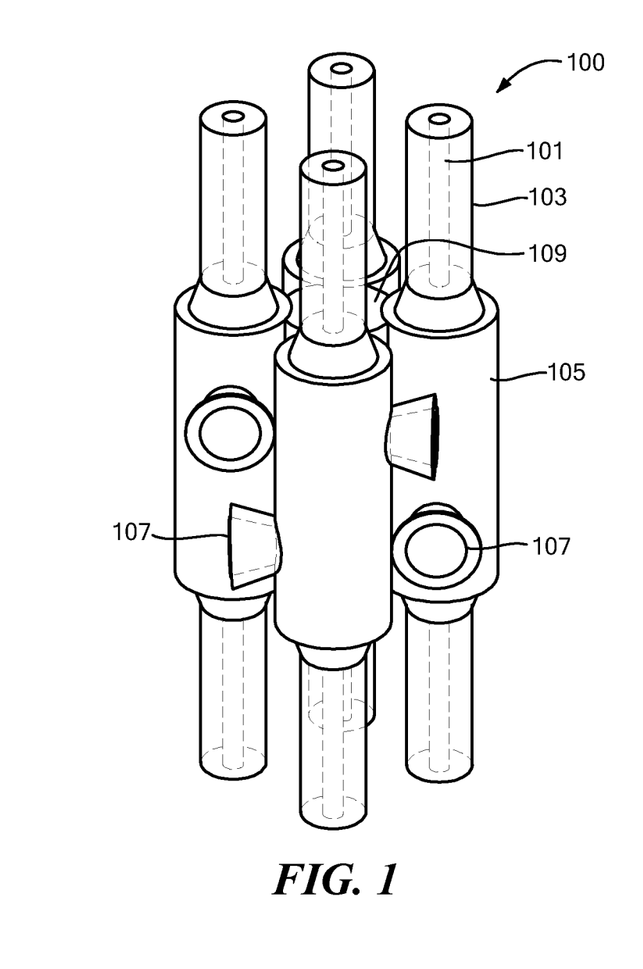
FIG. 1 is a perspective view of an exemplary embodiment of a cluster connector.
Figure 2:
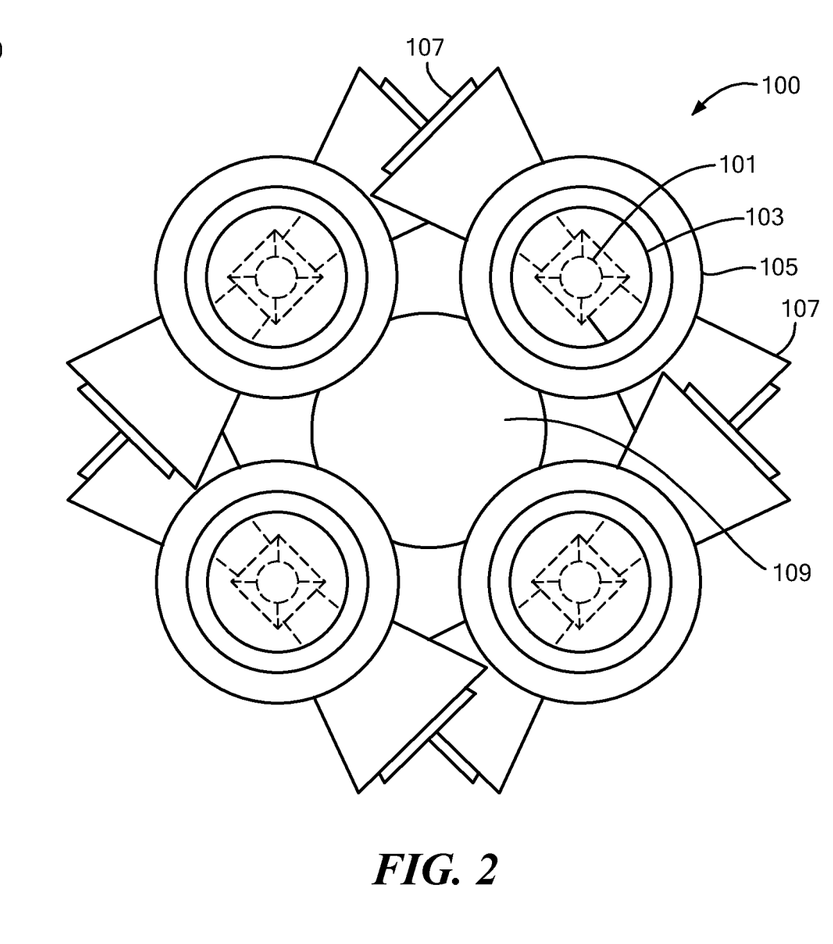
FIG. 2 is a top view of the cluster connector of FIG. 1.

FIGS. 1 and 2 are a perspective view of an exemplary embodiment of a cluster connector 100 and a top-view of the cluster connector 100, respectively. In the exemplary embodiment, the cluster connector 100 comprises four coaxial connectors, where each coaxial connector comprises a core conductor 101, a dielectric 103 around the core conductor 101, a metallic shield 105 around the dielectric 103, and two stubs 107. A ground connection 109 (e.g., a common ground connection) may be located at a center of, and connected to each of, the four coaxial connectors.

Each coaxial connector may be rotated 90 degrees from the orientation of an adjacent coaxial connector. However, the present disclosure is not limited to four coaxial connectors, two stubs 107 per coaxial connector, a particular length of each coaxial connector, a particular shape of each coaxial connector, the placement of the stubs 107 illustrated in FIG. 1, or a +/−90 degree rotation between adjacent coaxial connectors. The present disclosure may have 3 or more coaxial connectors, one or more stubs 107, any suitable shape, any suitable placement of the stubs 107, and any suitable rotation between adjacent coaxial connectors. When there are at least three coaxial connectors, the present disclosure may be used in a DF application.

The number of coaxial connectors, the number of stubs per coaxial connector, the length of each coaxial connector, the shape of each coaxial connector, the placement of the stubs 107, and the degree of rotation between adjacent coaxial connectors depends on the frequency of operation of attached antennas (e.g., individual antennas, a beamforming antenna, etc.) and whether any dielectric materials are present (e.g., air dielectric properties are close to free space). Wavelength in free space is equal to the speed of light divided by frequency. The length of the stubs 107 may be approximately $\frac{1}{4}^{th}$ of a calculated wavelength at a center frequency of operation. If other dielectric materials are present, wavelength is equal to the speed of light divided by a square root of a dielectric constant of the dielectric material times frequency. Thus, the range of the length of the stubs 107 varies according to what frequency the cluster connector 100 may be designed for. The spacing between the stubs 107 varies according to whichever spacing provides minimal reflection. The number of stubs may be based on how wide a bandwidth may be required for an application.

Figure 3:
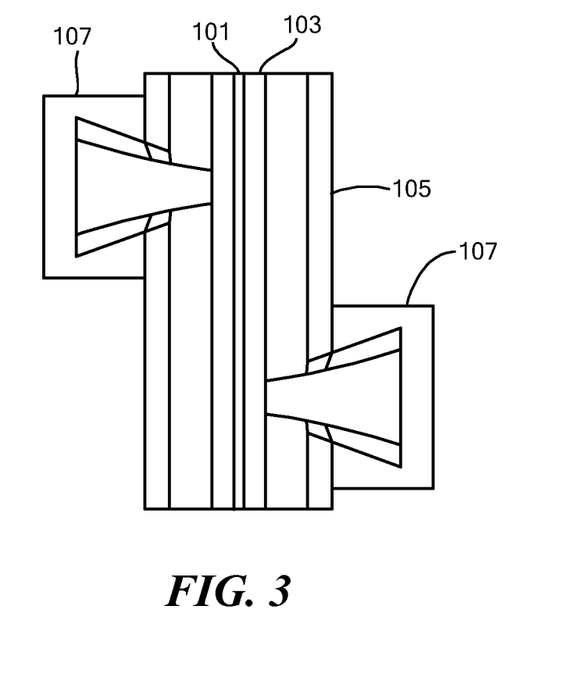
FIG. 3 is a side cross-sectional view of one coaxial connector in the cluster connector of FIG. 1.

FIG. 3 is a side cross-sectional view of one coaxial connector in the cluster connector 100 of FIG. 1. In the exemplary embodiment, two stubs 107 are illustrated, where the two stubs 107 are on opposite sides of the metallic shield 105 and at different locations along the length of the coaxial connector. Each stub 107 comprises a conductive (e.g., metallic) material and connects to the metallic shield 105 of one of the coaxial connectors of the cluster connector 100. However, the present disclosure is not limited to the number or placement of the stubs 107 in FIG. 3. Any suitable number and any suitable placement of the stub 107 may be used.

The stub 107 enables the cluster connector 100 to be phase matched to an antenna (e.g., an individual antenna, a beamforming antenna, etc.) connected to the cluster connector 100. The stub 107 may be flared. However, the present disclosure is not limited to such a shape. Other shapes may be used.

Figure 4:
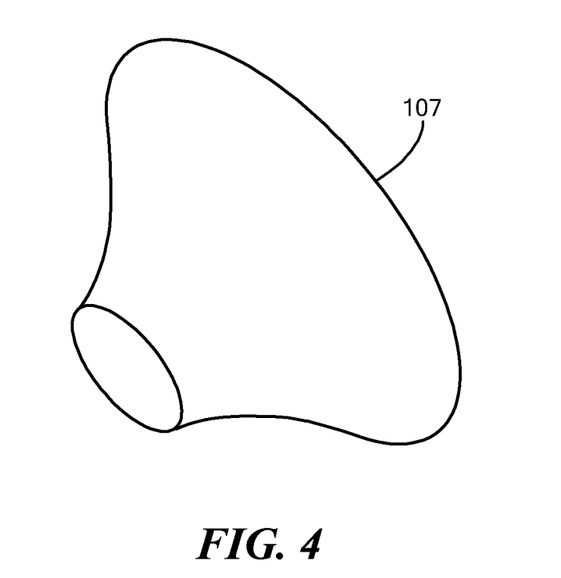
FIG. 4 is a perspective view of a flared stub of one of the coaxial connectors of the cluster connector of FIG. 1.

FIG. 4 is a perspective view of a flared stub 107 of each of the coaxial connectors in the cluster connector 100 of FIG. 1. At a quarter-wavelength distance in a transmission line a short circuit appears as an open circuit to an incoming wave. This occurs at a single frequency. For an ultra-wideband application, the stub 107 may be tapered at a shorting post (e.g., the metallic shield 105 of a coaxial connector of the cluster connector 100) with an exponential taper. However, the present disclosure is not limited to an exponential taper for the stub 107. Other tapers may be used (e.g., linear, triangular, exponential, and Klopfenstein tapers are possible) to provide a quarter wavelength to a range of frequencies rather than narrowband applications. The Klopfenstein taper has a profile that achieves a specified match in a shortest length and is based on the Chebychev filter design. A 3-dimensional flare is difficult to machine in conventional manufacturing but is easily manufactured in an additive manufacturing process (e.g., 3D printing, wherein 3D printing comprises stereolithography (SLA), direct light processing (DLP), and/or powder bed fusion). The length of the stubs 107 (e.g., shorting stubs), number of stubs 107, and spacing between the stubs 107 are electrical parameters that work in conjunction for achieving a good phase match to an attached antenna.

Figure 5:
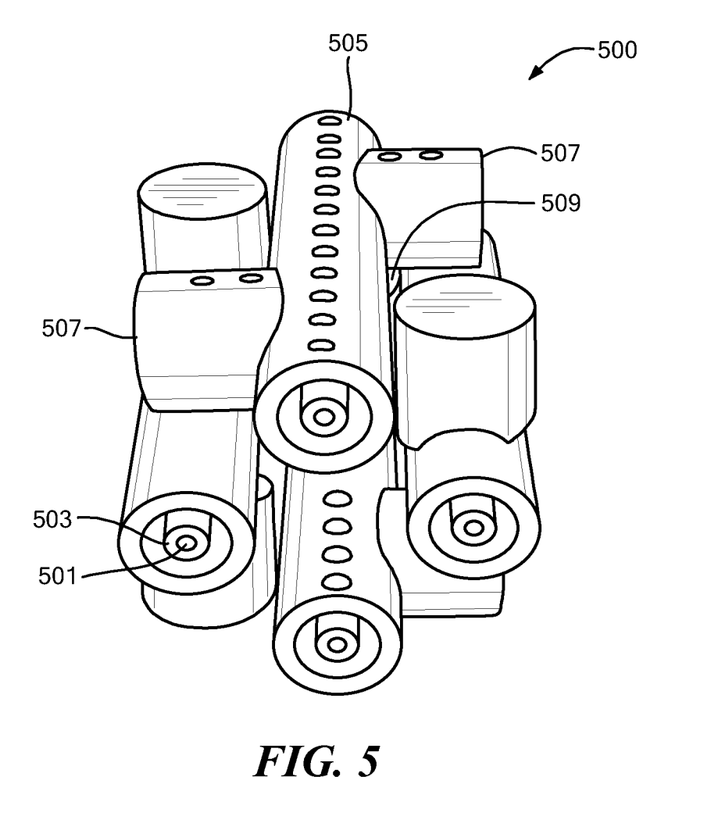
FIG. 5 is a top perspective view of an exemplary embodiment of a cluster connector.
Figure 6:
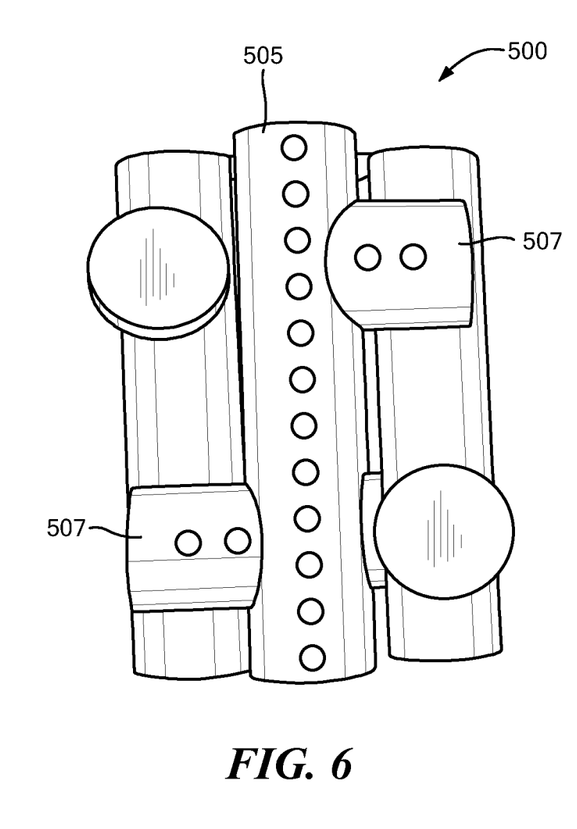
FIG. 6 is a side perspective view of the exemplary embodiment of the cluster connector of FIG. 5.

FIGS. 5 and 6 are a top perspective view and a side perspective view of an exemplary embodiment of a cluster connector 500, respectively. In the exemplary embodiment, the cluster connector 500 comprises four coaxial connectors, where each coaxial connector comprises a core conductor 501, a dielectric 503 around the core conductor 501, a metallic shield 505 around the dielectric 503, and two stubs 507. A ground connection 509 (e.g., a common ground connection) may be located at a center of, and connected to each of, the four coaxial connectors. The four coaxial connectors are as described above with respect to FIGS. 1 and 2 except for the shape of the stubs 507. In FIGS. 5 and 6, the stubs 507 are cylindrical. However, the present disclosure is not limited thereto.

Figure 7:
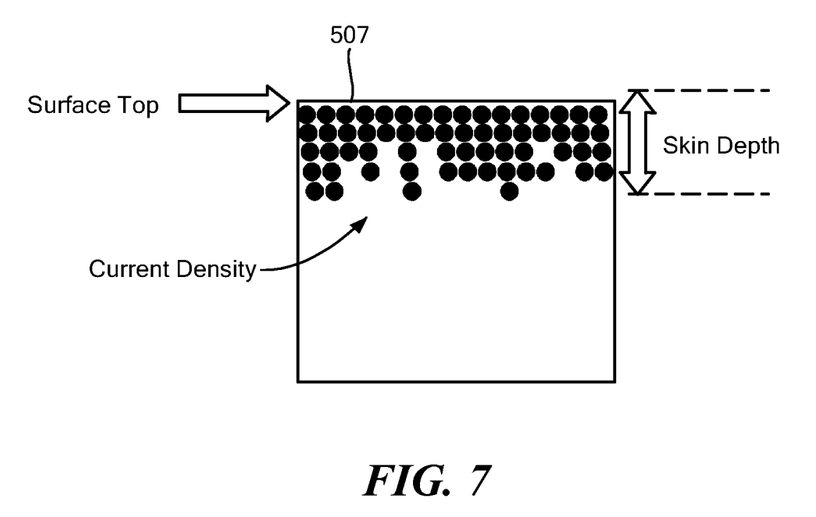
FIG. 7 is a side view of the stub of the cluster connector of FIG. 5.

FIG. 7 is a side view of the stub 507 of the cluster connector 500 of FIG. 5. In the exemplary embodiment, each stub 507 and each metallic shield has a surface roughness. For an additively manufactured component that carries electromagnetic (EM) waves, the surface roughness (e.g., the average height/depth of troughs and valleys in the surface) must be on the order of a skin depth. A skin depth is a depth of maximum current concentration at a particular frequency. In an exemplary embodiment, the metallic shield and the stub 507 may have a Roughness Average (RA) of 200 micro-inches to 400 micro-inches (e.g., 5-10 microns).

In an embodiment, each stub 507 comprises two surface finishes, an outer surface finish and an inner surface finish. In an embodiment, the outer surface finish may be approximately a 600 grit high polish finish (e.g., a mirror finish). However, the present disclosure is not limited thereto. The inner surface finish may have a RA of 200 micro-inches to 400 micro-inches (e.g., 5-10 microns). However, the present disclosure is not limited thereto.

Figure 8:
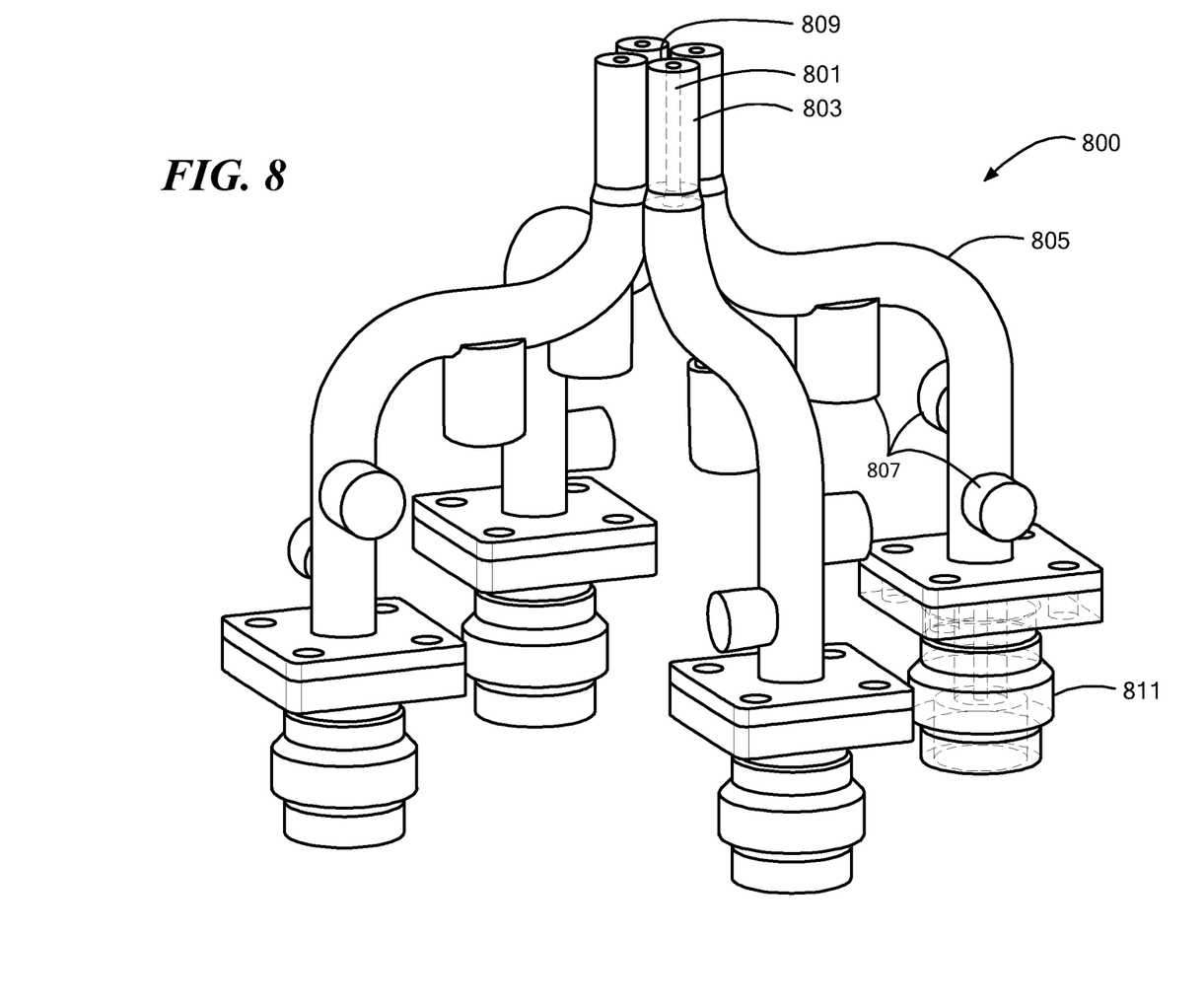
FIG. 8 is a perspective view of an exemplary embodiment of a cluster connector with bent coaxial connectors.

FIG. 8 is a perspective view of an exemplary embodiment of a cluster connector 800 with bent coaxial connectors. In the exemplary embodiment, the cluster connector 800 comprises four bent coaxial connectors, where each bent coaxial connector comprises a core conductor 801, a dielectric 803 around the core conductor 801, a metallic shield 805 around the dielectric 803, and three stubs 807. A ground connection 809 (e.g., a common ground connection) may be located at a center of, and connected to each of, the four bent coaxial connectors. An additional connector 811 may be connected to each end of the bent coaxial connectors of the cluster connector 800. In an exemplary embodiment, the additional connector 811 may also be connected to the other ends of the bent coaxial connectors of the cluster connector 800.

Each bent coaxial connector may be rotated 90 degrees from the orientation of an adjacent bent coaxial connector. However, the present disclosure is not limited to four bent coaxial connectors, three stubs 807 per bent coaxial connector, a particular length of each bent coaxial connector, a particular shape of each bent coaxial connector, the placement of the stubs 807 illustrated in FIG. 8, or a 90 degree rotation between adjacent bent coaxial connectors. The present disclosure may have 3 or more bent coaxial connectors, one or more stubs 807, any suitable shape, any suitable placement of the stubs 807, and any suitable rotation between adjacent coaxial connectors. When there are at least three coaxial connectors, the present disclosure may be used in a DF application.

Figure 9:
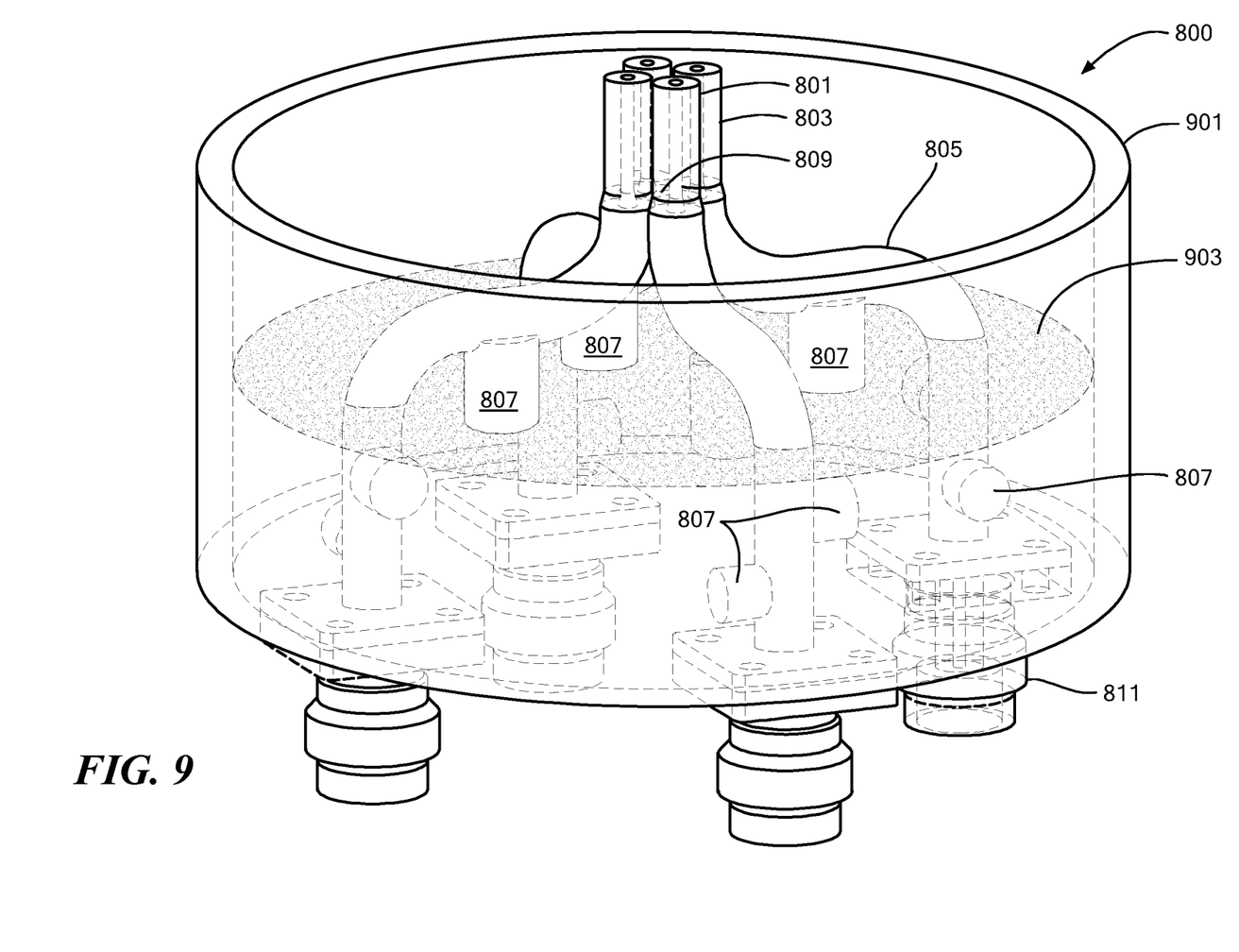
FIG. 9 is a perspective view of the cluster connector of FIG. 8 with a cavity and an absorber.

FIG. 9 is a perspective view of the cluster connector 800 of FIG. 8 with a cavity 901 and an absorber 903. In the exemplary embodiment, the cluster connector 800 is as described above but with a cavity 901 surrounding the cluster connector 800 and the cavity 901 half filled with an absorber 903.

The cavity 901 may be cylindrical with openings on each end to allow the bent coaxial connectors to pass therethrough. However, the present disclosure is not limited to a cylindrical cavity. Other shapes (e.g., square, rectangular, octagonal, etc.) are possible. The absorber 903 may be a broadband absorber that provides insertion loss from 1-18 GHz. In an exemplary embodiment, the absorber 903 is made up of absorber sheets sold by Mast Technologies (masttechnologies.com) and having SKU MF22-0009-00. One lobe of a two lobes/a bi-directional radiation response may be absorbed. The absorber 903 fills half of the cavity 901. However, the present disclosure is not limited thereto. The absorber 903 may fill more than 50% or less than 50% of the metallic cavity that encloses an antenna. The absorber 903 may be cut into a cylindrical shape to fit the cavity 901. Any other broadband absorber may be used. If a broadband absorber is not available, narrowband absorbers may be stacked to generate a broadband response. The absorbing material of the absorber 903 may absorb all radiation directed towards the cavity 901. Since an antenna may be broadband, the absorptive characteristics of the absorbing material of the absorber 903 may be broadband. Otherwise, reflections from the cavity 901 may impair radiation performance. The cavity 901, cluster connector 800, and an antenna may be additively manufactured as one metallic part. In an exemplary embodiment, the cavity 901, the cluster connector 800, a beamforming network, and an antenna may be additively manufactured as one metallic part.

Figure 10:
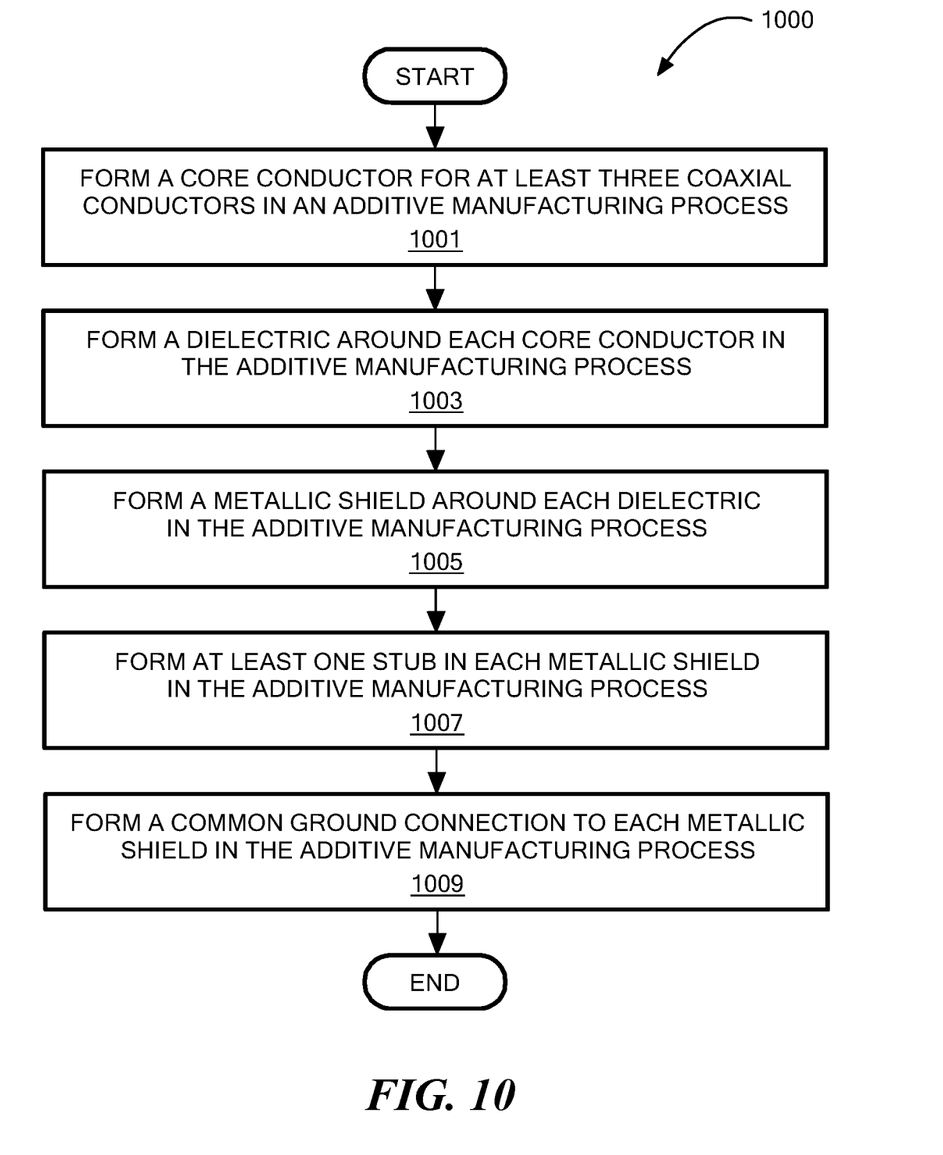
FIG. 10 is a flowchart of a method of manufacturing an exemplary embodiment of a cluster connector.

FIG. 10 is an exemplary embodiment of a method of manufacturing a cluster connector. In the exemplary embodiment, the method 1000 comprises forming a core conductor for at least three coaxial conductors in an additive manufacturing process in step 1001.

Step 1003 comprises forming a dielectric around each core conductor in the additive manufacturing process. Step 1005 comprises forming a metallic shield around each dielectric in the additive manufacturing process. Step 1007 comprises forming at least one stub on each metallic shield in the additive manufacturing process. Step 1009 comprises forming a common ground connection to each metallic shield in the additive manufacturing process.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. As noted above, in embodiments, the concepts and features described herein may be embodied in a digital multi-beam beamforming system. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An additively manufactured cluster connector, comprising:
   at least three coaxial-cable core conductors;
   a dielectric around each of the at least three coaxial-cable core conductors;
   a metallic shield around each dielectric;
   at least one stub on each metallic shield; and
   a common ground connection connected to each metallic shield.

2. The additively manufactured cluster connector of claim 1, wherein the at least three coaxial-cable core conductors, the dielectric, the metallic shield, the at least one stub, and the common ground connection are manufactured using a three dimensional (3D) process, wherein 3D printing comprises stereolithography (SLA), direct light processing (DLP), and/or powder bed fusion.

3. The additively manufactured cluster connector of claim 1, wherein the at least one stub is radially flared with a taper.

4. The additively manufactured cluster connector of claim 3, wherein the taper is one of exponential, triangular, or Klopfenstein.

5. The additively manufactured cluster connector of claim 1, wherein the at least one stub has a length of approximately $1/4^{th}$ of a calculated wavelength at a center frequency of operation of an antenna connected to the cluster connector.

6. The additively manufactured cluster connector of claim 1, wherein the at least one stub on one metallic shield comprises two stubs that are oriented on opposite sides of the metallic shield and the at least one stub on adjacent metallic shields are oriented +/−90 degrees from each other.

7. The additively manufactured cluster connector of claim 1, wherein each of the metallic shields has a surface roughness in an order of a skin depth, where the skin depth is a depth of maximum current concentration at a particular frequency.

8. The additively manufactured cluster connector of claim 1, wherein the at least one stub and each of the metallic shields has a Roughness Average (RA) of 5-10 microns.

9. The additively manufactured cluster connector of claim 1, wherein the at least three coaxial-cable core conductors are bent.

10. The additively manufactured cluster connector of claim 1, further comprising:
    a cavity; and
    an absorber.

11. A method of fabricating a cluster connector, comprising:
    forming a core conductor for at least three coaxial conductors using an additive manufacturing process;
    forming a dielectric around each core conductor using an additive manufacturing process;
    forming a metallic shield around each core dielectric using an additive manufacturing process;
    forming at least one stub on each metallic shield using an additive manufacturing process; and
    forming a common ground connection to each metallic shield using an additive manufacturing process.

12. The method of claim 11, wherein the additive manufacturing process used to form the core conductor, the dielectric, the metallic shield, the at least one stub, and the common ground connection for each of the at least three coaxial conductors is a three dimensional (3D) printing process that comprises at least one of stereolithography (SLA), direct light processing (DLP), and powder bed fusion.

13. The method of claim 11, wherein the at least one stub is radially flared with a taper.

14. The method of claim 13, wherein the taper is one of exponential, triangular, or Klopfenstein.

15. The method of claim 11, wherein the at least one stub has a length of approximately $1/4^{th}$ of a calculated wavelength at a center frequency of operation of an antenna connected to the cluster connector.

16. The method of claim 11, wherein the at least one stub on one metallic shield comprises two stubs that are oriented on opposite sides of the metallic shield and the at least one stub on adjacent metallic shields are oriented +/−90 degrees from each other.

17. The method of claim 11, wherein each of the metallic shields has a surface roughness in an order of a skin depth, where the skin depth is a depth of maximum current concentration at a particular frequency.

18. The method of claim 11, wherein the at least one stub and each of the metallic shields has a Roughness Average (RA) of 5-10 microns.

19. The method of claim 11, wherein the at least three coaxial conductors are bent.

20. The method of claim 11, further comprising:
    forming a cavity using an additive manufacturing process; and
    filling at least a portion of the cavity with an absorber.

* * * * *